(12) United States Patent
Kaufman

(10) Patent No.: US 7,665,641 B2
(45) Date of Patent: Feb. 23, 2010

(54) DEVICE SUPPORT

(76) Inventor: Jason Kaufman, 360 1st Ave., 3D, New York, NY (US) 10018

( * ) Notice: Subject to any disclaimer, the term of this patent is extended or adjusted under 35 U.S.C. 154(b) by 69 days.

(21) Appl. No.: 11/027,407

(22) Filed: Dec. 29, 2004

(65) Prior Publication Data

US 2006/0138301 A1   Jun. 29, 2006

(51) Int. Cl.
*A45F 5/00* (2006.01)
(52) U.S. Cl. .............. 224/261; 224/646; 224/270; 224/930
(58) Field of Classification Search ........... 224/623, 224/197, 627, 628, 631, 643, 646, 647, 930; 224/644, 929, 259, 261, 270; 248/682

See application file for complete search history.

(56) References Cited

U.S. PATENT DOCUMENTS

| | | | | |
|---|---|---|---|---|
| 3,661,308 A * | 5/1972 | Walters | ............ | 224/258 |
| 3,800,789 A * | 4/1974 | Schloss | ............ | 602/6 |
| 4,208,028 A * | 6/1980 | Brown et al. | ............ | 224/185 |
| 4,327,986 A * | 5/1982 | Carter | ............ | 396/423 |
| 4,637,536 A * | 1/1987 | Wong | ............ | 224/262 |
| 4,694,980 A * | 9/1987 | Rogers | ............ | 224/243 |
| 4,963,904 A * | 10/1990 | Lee | ............ | 396/423 |
| 5,207,791 A * | 5/1993 | Scherbarth | ............ | 273/148 B |
| 5,222,733 A * | 6/1993 | Brunty | ............ | 473/438 |
| 5,573,158 A * | 11/1996 | Penn | ............ | 224/265 |
| 5,582,337 A * | 12/1996 | McPherson et al. | ............ | 224/660 |
| 5,588,940 A * | 12/1996 | Price et al. | ............ | 482/105 |
| 5,664,750 A * | 9/1997 | Cohen | ............ | 248/231.71 |
| 5,725,136 A * | 3/1998 | Shires | ............ | 224/257 |
| 5,829,874 A * | 11/1998 | Breeding | ............ | 366/120 |
| 6,345,751 B1 * | 2/2002 | Elliot | ............ | 224/646 |
| 6,359,609 B1 * | 3/2002 | Kuenster et al. | ............ | 345/156 |
| 6,486,855 B1 * | 11/2002 | Pandolfi | ............ | 345/7 |
| 6,618,981 B1 * | 9/2003 | Rodriguez | ............ | 43/54.1 |
| 6,619,521 B2 * | 9/2003 | Hadley | ............ | 224/190 |
| 6,644,527 B1 * | 11/2003 | Karenga | ............ | 224/602 |
| 6,796,468 B1 * | 9/2004 | Nideborn et al. | ............ | 224/266 |
| 2004/0180631 A1 * | 9/2004 | Lim et al. | ............ | 455/90.3 |
| 2004/0211799 A1 * | 10/2004 | Loughman | ............ | 224/262 |
| 2005/0045681 A1 * | 3/2005 | Hancock et al. | ............ | 224/401 |

* cited by examiner

*Primary Examiner*—Nathan J Newhouse
*Assistant Examiner*—Justin M Larson
(74) *Attorney, Agent, or Firm*—Kenyon & Kenyon LLP

(57) ABSTRACT

A support system for devices having a back plate, and a support arm connected to the back plate, the support arm having a plate section with a device connection, the support arm configured to be jointed from the back plate, the back plate and the support arm in conjunction configured to hold a device in any one of a plurality of positions, wherein the support system is configured to be worn by an individual.

17 Claims, 6 Drawing Sheets

DEVICE SUPPORT

FIELD OF THE INVENTION

The present invention relates to the mounting of the physical objects. More specifically, the present invention provides a device support for supporting a physical object, such as a personal digital assistant, a camera, a global positioning system and a portable game system on a user in a comfortable and secure position.

BACKGROUND INFORMATION

In today's increasingly complex world, new electronic devices are constantly being created to enhance an individual's ability to perform work and other functions. All of these devices are highly interactive and must be frequently handled by the user in order to maximize the effectiveness of the device. The devices are generally designed for "on the go" individuals and are thus made portable to the extent that a user may carry a device about during the day. These devices are often specialized devices, such as scheduling devices or portable digital music systems, and thus perform a single task. If the user wishes to perform a different task than that performed by a specific device, a different device must be retrieved and utilized. As a consequence, the individual must handle different devices if different functionalities are required. As the number of devices increases, the ability of the user to effectively utilize the devices is decreased.

To alleviate handling problems, some individuals place these devices in a pocketbook or briefcase. Storage of the devices in this manner is unwieldy and hampers the user because of the limited accessibility of the device to the user during transit. An additional drawback of placing devices in a pocketbook or briefcase is that the devices are prone to damage. Many consumer electronic devices have integral touch screens and\or sensitive controls such as antennas. If these electronic devices not secured while they are not in use, the fragile components can be scratched, damaged or broken due to the jostling of the device during transport.

Some electronic devices are provided with a simple belt that loops through open supports provided on the electronic device. The individual then attaches the device to his or her person, using the belt in a supportive manner. These simple belt support devices, however, lack several key capabilities to optimize the use of the device by the individual. In the first instance, the supports are made for a "standard" individual (i.e. a person of averaged body dimensions) and are not adjustable beyond a certain extent. As a consequence, individuals who do not fit these standardized profiles, but who desire to use the device, usually do not support the device in a sufficient manner. This can ultimately lead to dislodging the device from the wearer and damage to the device. More often, the device is worn in an incorrect support position and therefore the individual must consciously protect the device during transit, therefore hampering the free mobility of the individual.

The belt systems are also designed to support a single device. If a different and/or additional device is required to be supported, the individual must purchase a separate belt system. This increases the overall cost for the individual. Individuals will also attempt to use the support system designed for a specific device for a different device. The use of the specific device support system for the different device can result in dropping or damage of the different device.

Common belt systems used for device support are also severely lacking in durability. The systems provided to support the devices merely provide nylon straps upon which the device is mounted. The nylon straps do not provide a durable connection to the device and will wear out quickly over the life of the belt system. Additionally, the belt systems do not allow for accurate positioning of the device in a multitude of support positions, and do not allow the user to tailor the position of the device to a desired position. More importantly, the belt systems cannot withstand impact or sudden shock, as the belts are not designed for these types of structural loading scenarios.

There is therefore a need to provide a support system which will allow a device to be supported over a wide range of physical body sizes of individuals.

There is also a need to provide a support system which will allow a device to be supported in a safe and secure position such that sensitive components of the device, for example touch screens and antennas, are not damaged.

There is also a need to provide a support system which will support devices in a standardized configuration such that a user may access a device in an easy and convenient manner.

There is also an additional need to provide a support system which will accept and support any one or more of a multitude of devices at the discretion of the user.

There is also a further need to provide a support system which will be durable and which will have a long service life.

There is a still further need to provide a support system that will allow the user to physically tailor the position of the device to any of several desired positions to enhance device effectiveness.

SUMMARY

It is an objective of the present invention to provide a support system which will allow a device to be supported over a wide range of individual physical body sizes.

It is also an objective of the present invention to provide a support system which will allow a device to be supported in a safe and secure position so that sensitive components of the device, such as touch screens and antennas, are not damaged.

It is also an objective of the present invention to provide a support system which will support devices in a standardized configuration such that a user may access the device in an easy and convenient manner.

It is also an objective of the present invention to provide a support system which will accept and support a multitude of devices at the discretion of the user.

It is a still further objective of the invention to provide a support system which will be durable and provide a longer life for the support system.

It is also an objective of the present invention to provide a support system that will allow the user to physically tailor the position of the device to several desired positions to enhance device effectiveness to the individual.

The objectives of the present invention are achieved as illustrated and described. The present invention provides a support system for devices, comprising a back plate and a support arm connected to the back plate, the support arm having a plate section with a device connection, the support arm configured to be jointed from the back plate, the back plate and the support arm in conjunction configured to hold a device in a docked position and an undocked position, wherein the support system is configured to be worn by an individual.

The objectives of the present invention are also achieved as illustrated and described in a second embodiment of the present invention. The second embodiment of the present invention provides a support system for supporting a device, comprising a back plate, a support surface connected to the back plate, a cushion connected to the support surface, a first section connected to the back plate, a second section connected to the first section through a first joint, a third section connected to the second section through a second joint, a plate section connected to the third section through a third joint, wherein the first, second and third joints are configured to assume a position in which the device is supported, a buckle connected to the back plate, and a strap system configured to be placed on an individual which interfaces with the buckle to allow the support system to be worn on an individual's body.

DETAILED DESCRIPTION OF EXAMPLE EMBODIMENTS

Figure 1:
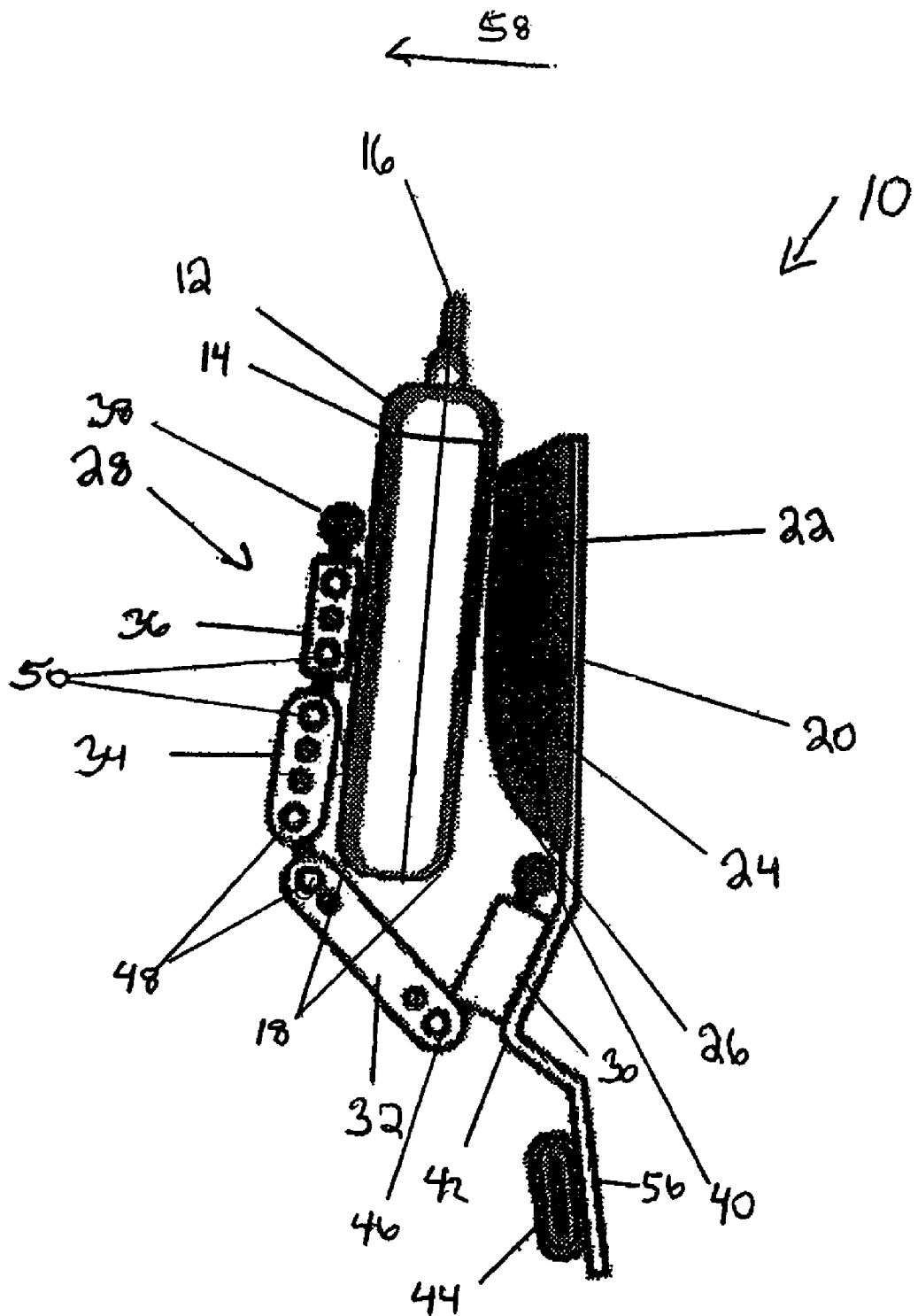
FIG. 1 is a side view of a support system in conformance with the present invention.
Figure 2:
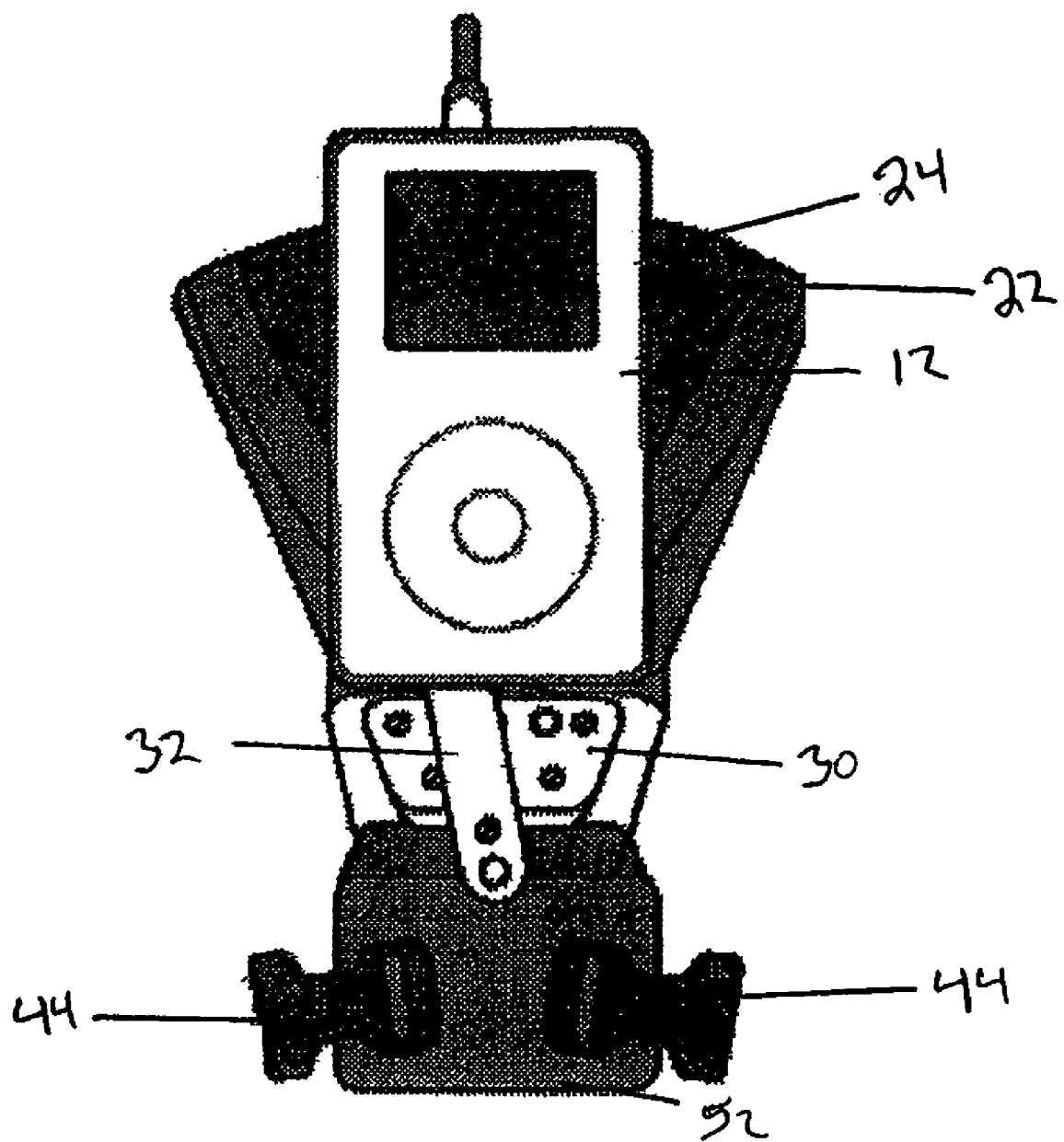
FIG. 2 is a front view of a support system in a docked position in an outward facing position.
Figure 3:
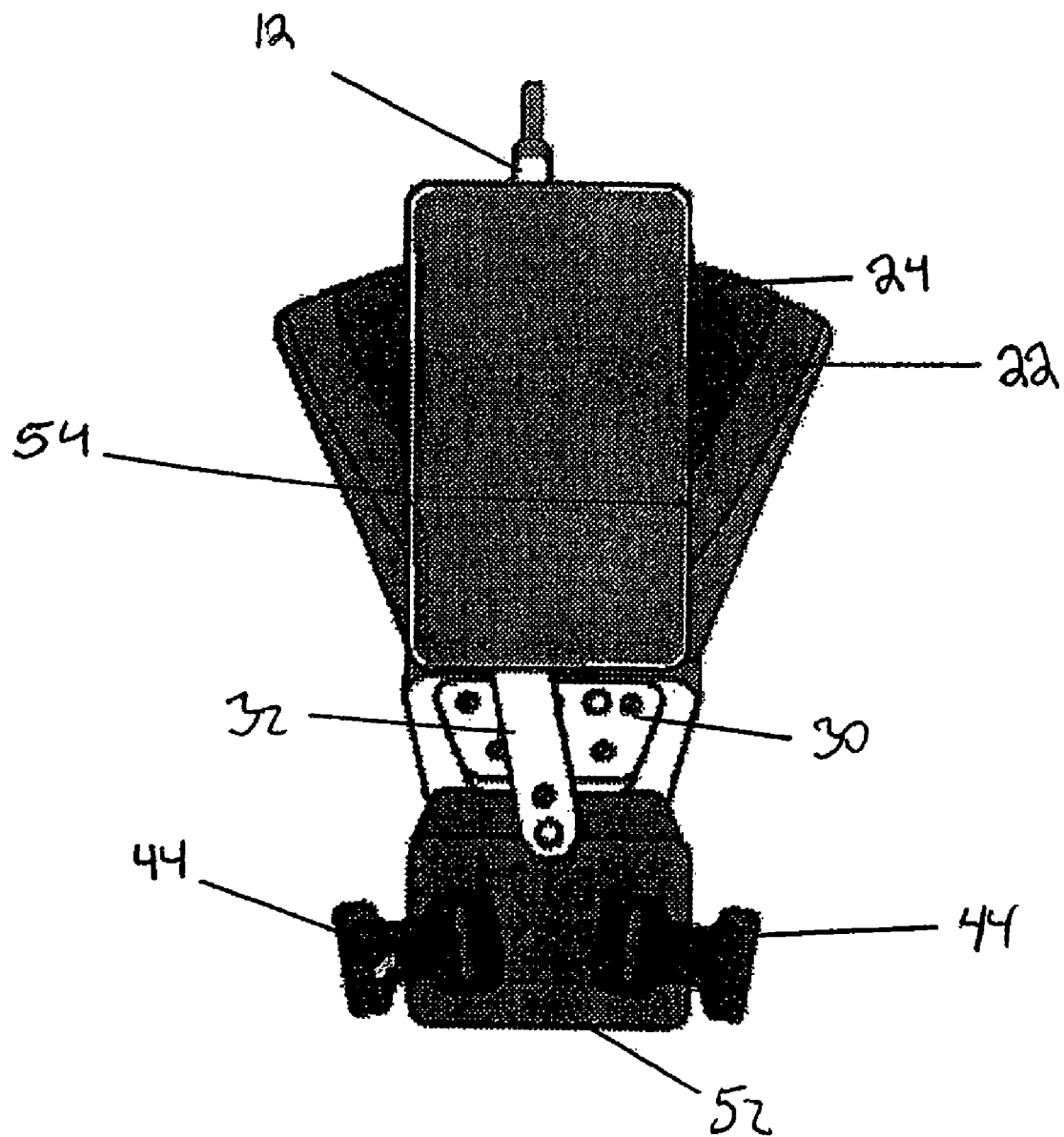
FIG. 3 is a front view of a support system in a docked position in an inward facing position.

Referring to FIGS. 1 to 3, an example embodiment of a support system 10 is illustrated. In this embodiment, the support system is configured to support any one of a number of different personal electronic devices. The support system 10 is configured to provide a support structure for a device 12 that is placed on the support system 10 such that both the support system 10 and the device 12 may be worn by an individual or may be used as a stand for the device. The wearing of the support system 10 and the device 12 by an individual allows these components to be easily accessible, while protecting the device 12. The device 12 may be a personal digital assistant (PDA), digital music stereo device, a global positioning system, or a telephone as illustrative non-limiting examples. The device 12 to be attached to the support system 10 has a defined thickness 14 and a defined length 16. The general shape of the device 12, as illustrated in FIG. 1, includes an exterior casing with rounded corners 18. As the support system 10 has moveable components, described later, the device 12 may be adjusted into numerous positions according to the wishes of the user. FIG. 1 illustrates a sample storage position for the device 12 where the device 12 is placed between a gap created between a support arm 28 and a back plate 20. The device 12 is held in position in the support system 10 through the use of the jointed support arm 28 which can confine the device 12 against a back plate 20 and an attached plate section 36 in a docked position, and allows the device 12 to be supported in any of a number of different positions.

The jointed support arm 20, in the non-limiting illustrated embodiment provided in FIG. 1, is configured from a first section 30, a second section 32, a third section 34 and a plate section 36. The jointed support arm 28 is connected to the back plate 20 at a bend 42 in the back plate 20. The bend 42 is positioned on the back plate 20 such that the jointed support arm 20 holds the device 12 in a position that is relatively flush to the cushion 24, thereby allowing for friction and restriction of the device 12 when in the stowed position illustrated. Although illustrated as providing a bend 42 of approximately 90 degrees along the length of the back plate 20 other configurations are possible and the illustrated embodiment is merely illustrative. Such other configurations include extending the overall length of the back plate and decreasing the angle at which the bend 42 occurs. The back plate 20 is made of non-corrosive materials, such as high density plastic and/or stainless steel, to provide proper structural support for the device 12 while the device 12 is being worn by an individual. The back plate 20 is intended to be worn across the sternum of an individual, and thus the back plate 20 may be contoured to allow for a comfortable fit for the individual using the support system 10.

The connection between the back plate 20 and the first section 30 is any configuration which will limit the amount of movement of the first section 30 relative to the back plate 20. In the illustrated embodiment, a screw connection is provided. Other types of connections between the first section 30 and the back plate 20 are possible and therefore the screw connection illustrated in FIGS. 1 through 3 is merely illustrative. These other connections can include a welded, brazed, integrally formed component, or a connection through an adhesive. The connection between the back plate 20 and the first section 30 is sufficient to withstand shear and moment forces imparted on the connection through operation of the support arm 28 when the device 12 is moved through different support configurations.

The first section 30 has an attached first end 40 that extends from the first section 30 towards a top of the back plate 20. The first end 40 extends from the first section 30 such that if the back plate 20 is bent by the user by a predefined amount, the first end 40 will contact the back plate 20 and limit further relative bending movement. The first end 40 is constructed of an interior core of steel coated by either a plastic or rubber coating. The first end 40 is shaped in the configuration of a ball. Other configurations are also possible wherein multiple first end units are provided, thereby dividing the total structural loads placed upon the first end 40 by the number of first end units provided.

A second section 32 is attached to the first section 30 in a jointed configuration. The first section 30 is stationary with respect to the back plate 20 due to the connection established between the first section 30 and the back plate 20. The second section 32 is provided with a first joint 46 which allows the second section 32 to be positioned relative to the first section 30. The first joint 46 may allow for translational and rotational movement between the first section 30 and the second section 32. A third section 34 is attached to the second section 32 through a second joint 48. In a similar manner, a plate section 36 is attached to the third section 34 through a third joint 50. All of the individual joints provided, namely the first joint 46, the second joint 48, and the third joint 50, allow relative movement between the sections they respectively interconnect. All joints provided may allow for relative translational movement and rotation between sections. The first joint 46, the second joint 48, and the third joint 50 are configured such that the device 12 is held against the back plate 20 in a non damaging position. The first joint 46, the second joint 48 and the third joint 50 are also configured to provide friction sufficient to allow the arm 28 to remain in a desired position as determined by the user.

To aid in the non-destructive support of the device 12, a support surface 22 is placed onto the back plate 20. The support surface 22 provides an inclined surface upon which a cushion 24 is placed. The cushion 24 is placed on the support surface 22 to provide a non-damaging connection point when the device 12 contacts the overall support provided by the back plate 20. The cushion 24 may be angled, such as in an arc as provided in FIG. 1, to allow the device 12 to be supported along a wide support surface.

The plate section 36 provides the support section upon which the device 12 is placed. The plate section 36 is composed of a material, such as high density plastic, to provide a rugged and durable support surface for the device 12 and to provide a lightweight configuration for the user. At the top of the plate section 36, a second end 38 is established to allow the user to grab the support arm 28. The second end 38 is constructed of an interior core of steel coated by either a plastic or rubber coating to limit slip during gripping of the second end 38. The second end 40 is shaped in a configuration of a ball. Other configurations are also possible wherein multiple second end units are provided, thereby dividing the total loads placed upon the second end by the number of second end units provided.

The support system 10 is also provided with a series of buckles 44 attached to the back plate 20. The purpose of the buckles 44 is to allow a strap system to be connected to the remainder of the support system 10 to allow a user to wear the support system 10. The buckles 44 are made of a lightweight material, such as plastic, to minimize the overall weight of the support system 10. The buckles may be designed such that the user may quickly engage and disengage the latching features of the support 10. The buckles 44 are attached to the back plate 20 through the use of a pivot connection or an adhesive.

The back plate 20 is provided with a surface 56 which is worn against the user. In the illustrated embodiment of the present invention, the support system 10 is worn against the chest of the user. The back plate 20 is pressed against the sternum of the individual and the device 12 is connected to the support arm 28. In the illustrated embodiment, the support system 10 supports a digital music player 12. The digital music player 12 is positionable on the support arm 28 such that the individual using the support system 10 may review the currently selected music being played by the digital music player 12 (i.e. the user may see the touch screen). As illustrated, the support system 10 allows an individual to carry the digital music player 12 without requiring the hands of the individual to be used. This provides greater freedom and mobility of the individual using the support device 10. In the illustrated embodiment provided in FIG. 1, the digital music player 12 is placed in the support system 10 such that the operative controls and touch screen contact the soft cushion 28 provided on the back plate 20. By storing the digital music player in this configuration, the controls of the digital music player 12 are protected from damage. If the user wishes to access the controls of the digital music player 12, the support arm 28 is then grasped at the second end 38 and the digital music player 12 is pushed in direction 58. This allows the individual using the support system 10 to view the face of the device 12. If the user wishes to allow other individuals to view the faceplate of the device 12, then the device 12 may be rotated through the use of the first joint 46, second joint 48 and\or third joint 50.

Referring to FIG. 2, the support system 10 is illustrated supporting a digital music player 12, wherein the digital music player 12 is attached to the support arm 28. The digital music player 12 is attached on a backside of the device by the plate section 36. In this docked configuration, the digital music player touch screen and controls may be observed by other individuals as the screen is positioned for such viewing.

Referring to FIG. 3, the support system 10 is illustrated wherein only the back exterior of the digital music player is observable. In this configuration, the touchscreen may be protected through contact with the cushion 24. Both configurations provided in FIGS. 2 and 3 are achievable through the use of joints 46, 48 and 50.

Figure 4:
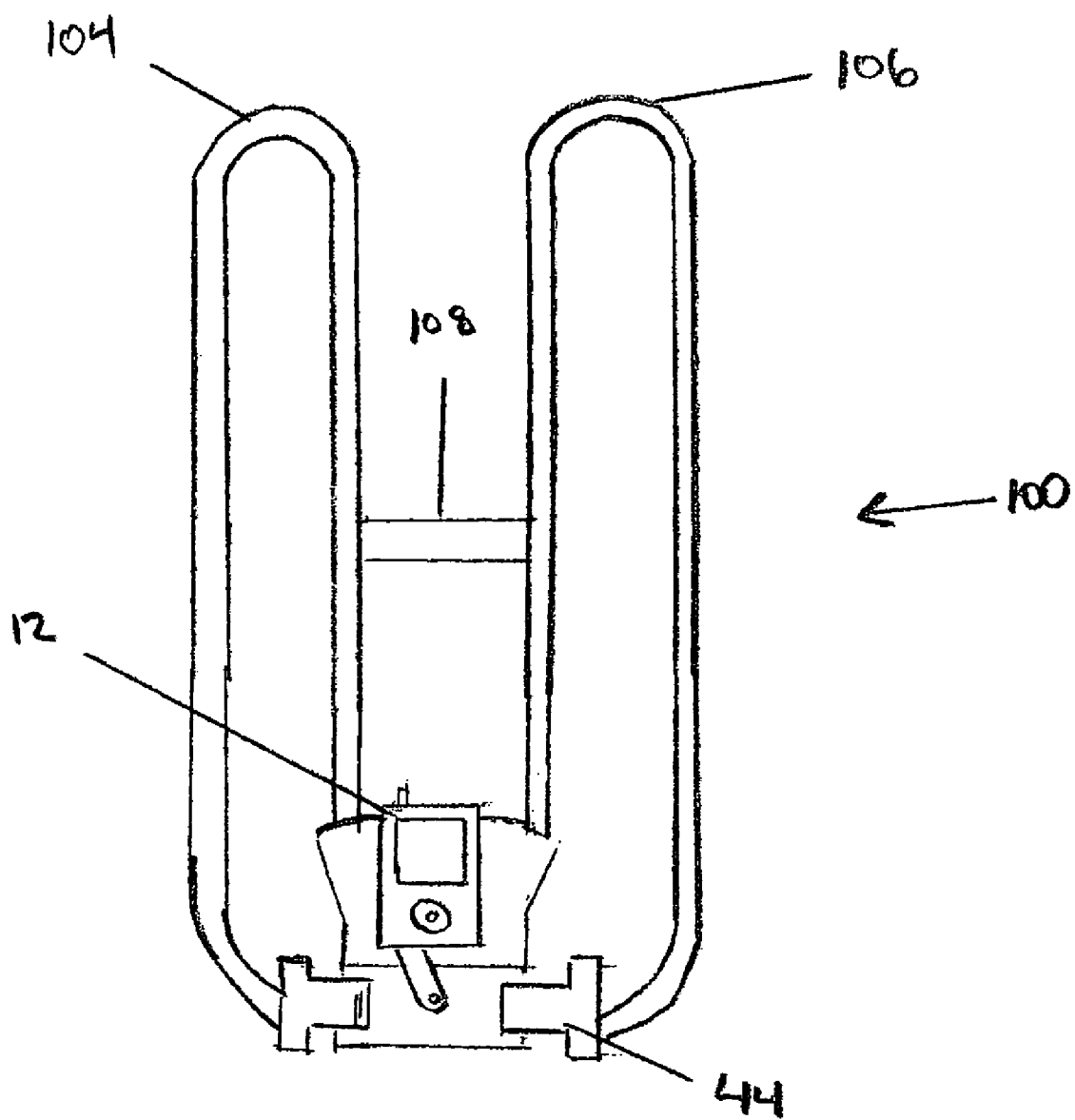
FIG. 4 is a view of a support system strap arrangement.

Referring to FIG. 4, a strap system 100 for the support system 10 is illustrated. The strap system 100 allows the support system 10 to be worn by an individual in a comfortable position, for example on the sternum, so that the user may carry a desired device without having to use his/her hands. The strap system 100 has two shoulder straps 104, 106 which are placed over the shoulder to provide support for the support system 10. The strap system 100 may be released and the entire support system 10 removed by unbuckling the buckles 44. The strap system 100 is made of a strong, high quality material that will resist stains and wear. Such materials may include leather, cotton, neoprene or other suitable materials. The strap system 100 may also incorporate a back connector 108 to restrict movement of the strap system 100 on the shoulders of the individual. If the device 12 to be supported is large and/or heavy, the strap system 100 may also use shoulder pads to more evenly distribute the loads from the strap system 100 to the individual. The shoulder pads, if used, may incorporate speakers, therefore allowing the user to listen to music without the need for headphones. The strap system 100 also may be configured to house extra batteries or components for the electronic device supported.

The support system 10 may also be used to support multiple devices at a single time. The plate section 36 may be designed with multiple connections such as a screw connection 35 or a clip connection, to allow a plurality of devices to be supported. The connections established between the plate section 36 and the device 12 may be quick-disconnect connections, thereby allowing the user to quickly and efficiently remove the device 12 from the support system. The support system 10 is also configured to minimize obstruction to key features of the device 12, such as recharging ports placed at a bottom of the device 12.

Figure 5:
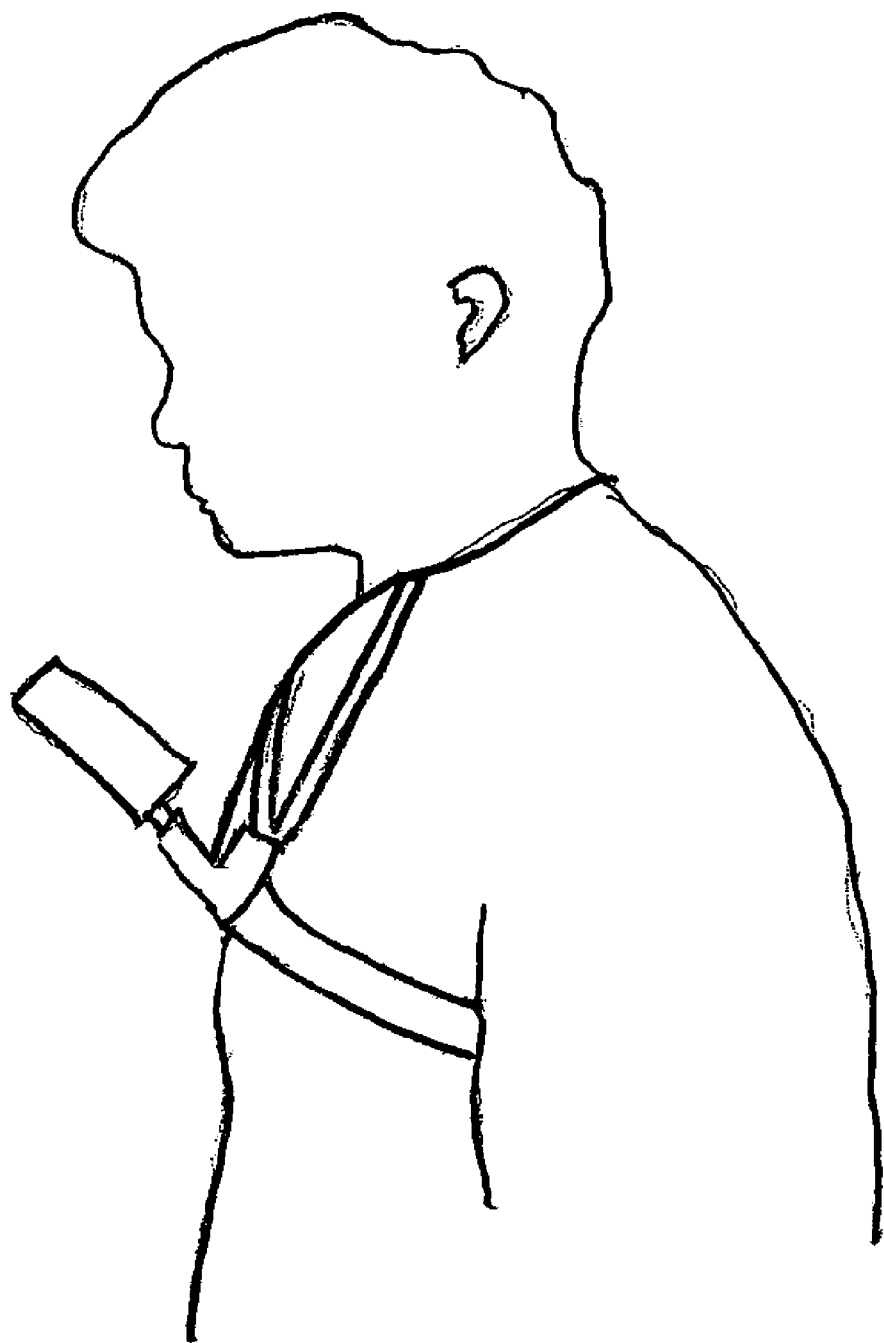
FIG. 5 is a view of an example embodiment of a support system as worn by an individual.
Figure 6:
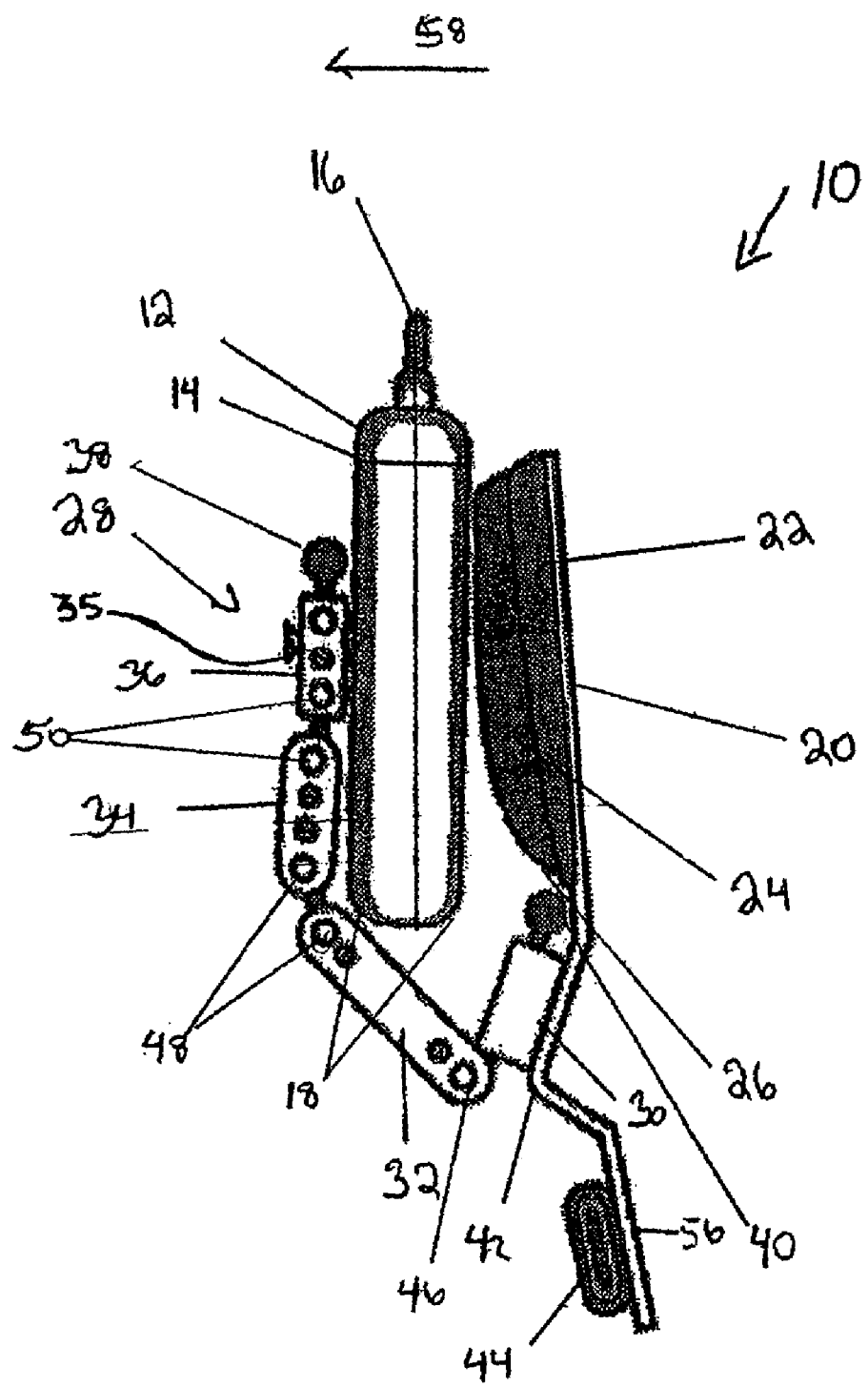
FIG. 6 is a side view of the support system of FIG. 1 with a screw connection.

FIG. 5 illustrates the support system 10 as worn by an individual. The support system 10 is worn on the sternum, for example, so that the device may be viewed by the individual wearing the system 10. The system 10 may also be contained in a pouch or similar device to allow the system 10 and the attached unit to be transported as a single unit. The pouch can be connected to the system 10 or may be separable. The pouch can provide a storage location for items, such as money, keys, credit card as non-limiting examples. The pouch can be connected to the system 10 through a snap connection established on both the system 10 and the pouch. The cushion 24 may also be configured to house such items, wherein the cushion 24 has an optional depression for easy storage of items.

The current invention provides many benefits over conventional device support systems. The current support system allows a device to be supported over a wide range of physical body sizes of individuals and therefore can be used by a large segment of the consumer population. The support system allows a device to be supported in a safe and secure position such that sensitive components of the device, such as touch screens and antennas, are not damaged, therefore saving consumers from unnecessary repairs. The support system also supports devices in a standardized configuration such that a user may access the device in an easy and convenient manner. The present invention also provides a support system which will accept and support a multitude of devices at the discretion of the user as well as being durable and having a long service life. The present invention also provides a support system that will allow the user to physically tailor the position of the device to several desired positions to enhance device effectiveness.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A support system for devices, comprising:
   a back plate having a front surface and a back surface opposite the front surface, the back surface facing a user when the support system is being worn by the user;
   a support arm connected to the back plate, the support arm having a plate section with a device connection, the support arm having a first joint, a second joint, and a third joint;
   a support surface element having a front surface and a back surface opposite the front surface, the back surface of the support surface element facing the user when the support system is being worn by the user, the back surface of the support surface element connected to and extending along the front surface of the back plate; and
   a cushion having a back surface facing the user when the support system is being worn by the user, the back surface of the cushion connected to and extending along the front surface of the support surface element;
   wherein the support system is configured to be worn by the user such that the back surface of the back plate rests against a sternum of the user when standing without being held in such position by the user's hands or arms;
   wherein the back plate and the support arm in conjunction are configured to hold a device in any one of a plurality of positions when the support system is being worn by the user, including a first position in which the device contacts the cushion and a second position in which the device is positioned outwardly away from the sternum and the cushion such that the device is operable using both of the user's hands; and
   wherein the first joint, the second joint, and the third joint allow the plate section to rotate with respect to the back plate about three independent rotation axes that respectively correspond to the first joint, the second joint, and the third joint.

2. The support system according to claim 1, further comprising:
   at least two buckles connected to the back plate and configured to accept a strap.

3. The support system according to claim 1, wherein the front surface of the support surface element is inclined relative to the back surface of the support surface element.

4. The support system according to claim 1, wherein the plate section is configured to support any one of a number of different types of personal electronic devices.

5. A support system for supporting a device, comprising:
   a back plate;
   a cushion connected to a front surface of the back plate;
   a first section connected to and stationary relative to the back plate such that it cannot pivot relative to the back plate;
   a second section connected to the first section through a first joint;
   a third section connected to the second section through a second joint;
   a plate section connected to the third section through a third joint, wherein the first, second and third joints are configured to assume a position in which the device is supported;
   a support surface element, a back surface of the support surface element connected to and extending along a front surface of the back plate, the back surface of the cushion connected to and extending along a front surface of the support surface element; and
   a strap connected to the back plate and configured to maintain a back surface of the back plate against a sternum of the user when standing without being held in such position by the user's hands or arms;
   wherein the cushion is between the back plate and the plate section, and
   wherein the first joint, the second joint, and the third joint allow the plate section to rotate with respect to the back plate about three independent rotation axes that respectively correspond to the first joint, the second joint, and the third joint.

6. The support system for supporting a device according to claim 5, wherein the back plate is bent approximately at a ninety degree angle.

7. The support system for supporting a device according to claim 5, wherein the plate section has a screw connection to attach to the device.

8. The support system for supporting a device according to claim 5, wherein the strap includes two shoulder straps.

9. The support system for supporting a device according to claim 8, further comprising:
   a back connector to restrict lateral motion of the two shoulder straps on shoulders of an individual wearing the support system.

10. The support system for supporting a device according to claim 5, wherein the first section, the second section, the third section and the plate section are made of a non-corrosive material.

11. The support system for supporting a device according to claim 10, wherein the non-corrosive material is high density plastic.

12. The support system for supporting a device according to claim 10, wherein the non-corrosive material is a stainless steel.

13. A support system for supporting a device comprising:
    a back plate;
    a cushion connected to the back plate;
    a first section connected to and stationary relative to the back plate;
    a second section connected to the first section through a first joint such that the second section is rotatable with respect to the first section about the first joint;
    a third section connected to the second section through a second joint such that the third section is rotatable with respect to the second section about the second joint;
    a support surface element, a back surface of the support surface element connected to and extending along a front surface of the back plate, the back surface of the cushion connected to and extending along a front surface of the support surface element;
    a plate section connected to the third section through a third joint such that the plate section is rotatable with respect to the third section about the third joint, wherein the first, second and third joints are configured to assume a position in which the device is supported, wherein the support surface element, the back plate, and the cushion each having a back surface, facing a user when the support system is being worn by the user, and a front surface opposite the back surface, wherein the cushion is between the back plate and the plate section; and
    a strap connected to the back plate and configured to maintain the back surface of the back plate against a sternum of the user when standing without being held in such position by the user's hands or arms.

14. The support system for supporting a device according to claim 13, wherein the front surface of the support surface element is inclined relative to the back surface of the support surface element.

15. The support system for supporting a device according to claim 14, wherein the strap is made of cotton.

16. The support system for supporting a device according to claim 14, wherein the strap is made of neoprene.

17. The support system for supporting a device according to claim 14, wherein the strap is made of leather.

* * * * *

UNITED STATES PATENT AND TRADEMARK OFFICE
CERTIFICATE OF CORRECTION

| | |
|---|---|
| PATENT NO. | : 7,665,641 B2 |
| APPLICATION NO. | : 11/027407 |
| DATED | : February 23, 2010 |
| INVENTOR(S) | : Jason Kaufman |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 207 days.

Signed and Sealed this

Seventh Day of December, 2010

David J. Kappos
*Director of the United States Patent and Trademark Office*